United States Patent [19]

Szonn et al.

[11] 3,988,940

[45] Nov. 2, 1976

[54] TRANSMISSION BELT AND METHOD OF MAKING SAME

[75] Inventors: Reinhold Szonn, Lemforde; Rudolf Breher, Hausberge, both of Germany

[73] Assignee: Breco Kunststoffverarbeitungs-GmbH & Co. KG, Porta Westfalica, Germany

[22] Filed: Oct. 19, 1973

[21] Appl. No.: 408,005

[30] Foreign Application Priority Data

Oct. 20, 1972 Germany............................ 2251454

[52] U.S. Cl. ............................................. 74/231 J
[51] Int. Cl.² .......................................... F16G 1/00
[58] Field of Search............... 74/231 J, 89.2, 237, 74/239

[56] References Cited
UNITED STATES PATENTS 2,547,220 4/1951 Merrill .............................. 74/231 J
3,105,389 10/1963 Henson ............................. 74/231 J
3,744,095 5/1972 Tomlinson ........................ 74/231 J Primary Examiner—Benjamin W. Wyche
Assistant Examiner—Wesley S. Ratliff, Jr.
Attorney, Agent, or Firm—Walter Becker

[57] ABSTRACT

An endless transmission belt comprising a web of elastic belt material with pull-resistant strength carriers embedded therein and method of making same, according to which the belt is made from a web of elastic belt material having pull-resistant strength carriers embedded therein and extending in the longitudinal direction of the web. A desired length is cut off from the web in such a way that the ends of the cut off length of belt material have tongue means and recess means precisely complementary to and fitting into each other. The ends are bent toward each other and fitted into each other and are then intimately united, for instance, by welding vulcanizing, or cementing, along the cut edges thereof.

9 Claims, 8 Drawing Figures

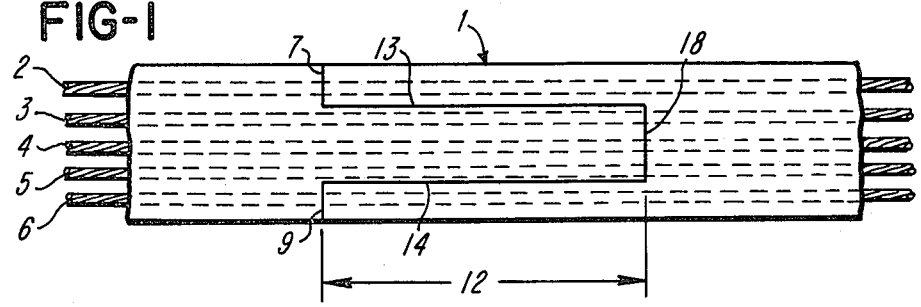
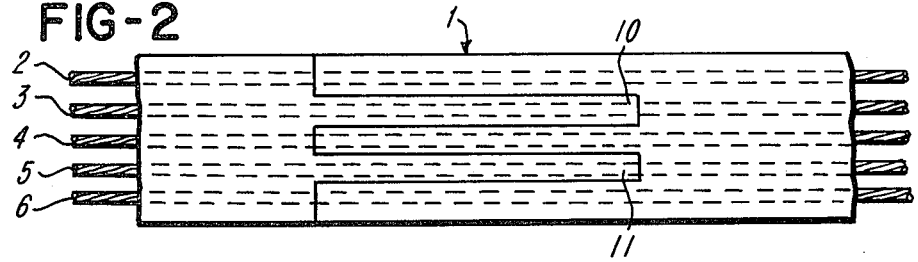
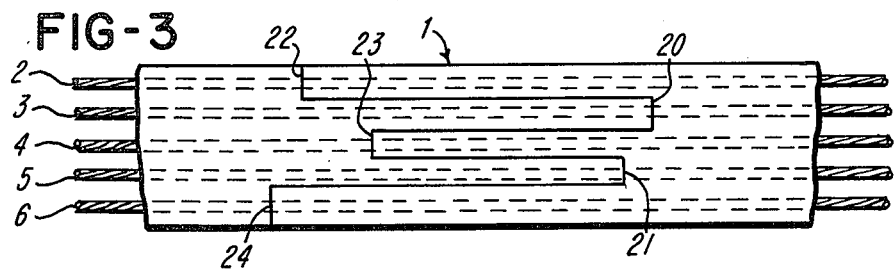
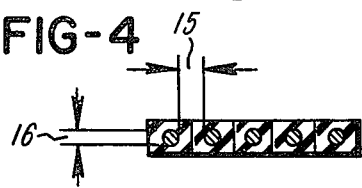
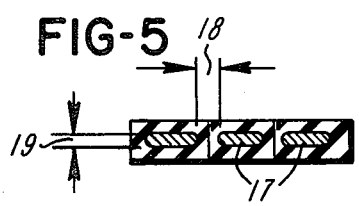
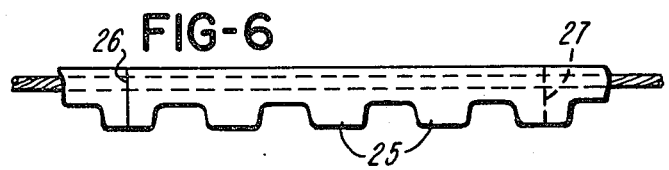
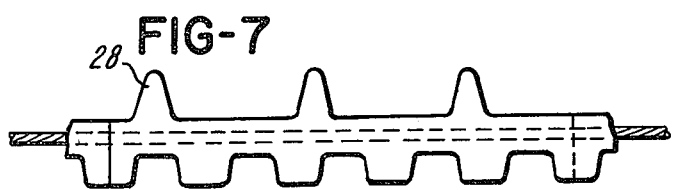

TRANSMISSION BELT AND METHOD OF MAKING SAME

The present invention relates to a transmission belt and more specifically concerns a belt which is made out of a material normally stored in the form of a bolt similar to yard goods and from which desired lengths are cut off which are then made endless by connecting the cut off section so that a uniform cross section without abutment area and without changing the bending flexibility and the elastic conditions during the encountering of tension stresses will be obtained.

With belts which have to run in a precise vibration-free manner, especially at higher speeds, the following conditions are to be met:

1. Homogeneity of the material over the circumferential length of the belt;
2. Uniform cross section;
3. Maintaining the neutral bending line of the cross section;
4. Moving ahead of the pull carrier plane over the endless made area at the same thicknenss layer which means in the same neutral plane as with the moving material;
5. Uniform pull stress behavior of the strength carrier inserts over the total width;
6. Uniform preload of the strength carrier particles over the width of the belt;
7. Merger of the belt material including the reinforcement of the strength carriers at the endless connection without stiffening the bending ability and without changes in the specific gravity.

Experience has shown that the total of these conditions when an increased quality is required are met primarily by belts with which the strength carriers consist of inserted threads, cables, or the like, which with narrow tolerances concerning the pull stresses and with identical finish tension are located closely adjacent to each other in the same neutral plane.

With fabric and other layer inserts, steps are necessary in order to obtain the precision required for a uniform running behavior of the belt. All heretofore known belts made endless show at the endless area some inhomogeneities which can be ascertained in part already by static tests. The following methods of making belt sections endless are known and have shown the following deficiencies:

a. Overlapping with straight, biased, and offset edge ends according to which the material is cemented, welded, or vulcanized. This connection even with spliced ends is usable only for low stresses while the transmission shock is felt to a greater or less extent.

b. Connection with stepped layers as they are employed in connection with conveyor belts have a satisfactory uniform run only when also the layer-shaped strength carriers are arranged in stepped manner with regard to each other. This multilayer fabrication is suitable only for heavy belts which, in view of the relatively low running speeds, do not have to meet increased precision requirements with regard to their dynamic behavior.

c. Welding and clamping connections of the strength carrier construction with subsequent overlapping (cementing, welding, or vulcanization, the nonuniformity is always felt particularly during the operation. The liability to disorders increases considerably with decreasing running diameter.

d. Connection by open or exposed special locks. In this instance, the degree of uniformity is particularly felt and a beating noise cannot be avoided.

e. Simple cross-sectional butt connections. These are sometimes prepared in a direction perpendicular to the length but also at an incline thereto, or also in the manner of an arrow. These connections will at any rate cut through the strength carrier elements. The transmitting force is limited by the strength of the belt-forming material.

f. The teeth-like interengagement with butt connection of the edges. While this connection results in a considerable extension of the interconnected edges, it will be appreciated that also in this instance the strength elements are cut through one after another. The respective only short offset arrangement does not result in any material strength transfer between the belt material and the strength carriers. Therefore, a considerably reduced transmitting force will result with belts made endless in this manner.

It is, therefore, an object of the present invention to provide a transmission belt which will overcome the above mentioned drawbacks.

This object and other objects and advantages of the invention will appear more clearly from the following specification, in connection with the accompanying drawings, in which:

FIG. 1 shows a belt according to the invention.

FIG. 2 illustrates a connection through the intervention of tongues.

FIG. 3 shows a connecting section with offset end sections of the tongue ends.

FIG. 4 shows in section through a connecting area a belt with the customary insert strength threads of a round cross section.

FIG. 5 shows small bands forming inserts.

FIG. 6 illustrates a toothed belt.

FIG. 7 shows a toothed belt with additional profile blocks on the back of the belt.

FIG. 8 illustrates a belt with a longitudinal profile, preferably in V-belt form.

The belt made endless according to the present invention consists primarily of elastic belt material and strength carriers, and is characterized in that preferably parallel to the strength carrier inserts, for instance, in the form of threads, tongue-shaped protrusions engage each other which are connected at the cutting edges by welding, cementing, or vulcanization. The belt ends are with precisely interfitting tongue ends which are correspondingly punched or cut connected at their edges to each other in such a way that the tolerance correct length, and with profiles, the necessary pitch precision, will be assured. When employing thermoplastic material a fusion is effected for connecting purposes. Also cementing or vulcanization is possible when rubber material is involved.

The most important feature of the invention is seen in the course of the cut between the strength carriers or threads which are closely located adjacent to each other in such a way that with the short distance of the belt material from thread to thread, as small a shear deformation stroke as possible will be effected by the pulling force of the belt. This slight shear deformation stroke depends on the position and the entire length of the edges of the interengaging tongues. These lengths of tongues may be determined by calculation so that the shear deformation will lie within a minimum tolerance so that the length precision of the belt will be maintained also when the belt is subjected to high pulling stresses.

This fact is particularly important with toothed belts having pulling threads or belt reinforcements therein which are located adjacent to each other and with which the precise pitch engagement of the gears must not be affected by undue local stretching or uniformities.

With belts having pull threads located adjacent to each other or also with stronger cables, the longitudinal sections of the tongues are parallel to these inserts. This also applies to inserts of small belts.

If, however, a closed fabric layer or a tight intermediate layer of any desired material is employed as insert, it will be appreciated that while the tongue-like section separates this insert, nevertheless when a connection is established by fusing, gluing, or vulcanizing, a thin film forms in the section gap, which film likewise transmits the occurring shearing forces from one edge of the tongues to the other edge thereof.

Referring now to the drawing illustrating different embodiments of the invention, FIG. 1 shows a belt 1 with strength carriers or insert threads 2 – 6. A single tongue extends over the cutting edges of 7, 13, 18, 14 until 9. The reference numeral 12 indicates the transmission length of the single tongue. The occurring belt pull force is absorbed by the strength carriers 2, 3 and 5, 6. FIG. 2 shows a connecting area with the tongues 10 and 11. Around each pull thread there is placed a tongue. The complete pulling force of the otherwise not separated belt is transmitted under a slight pull extension.

FIG. 3 shows a connecting area with the end sections 20, 21 and 22 – 24 of the tongue ends arranged in an offset manner. Inasmuch as the cut through pull threads favors a slight buckling angle at bending stresses, it is advantageous for belts which move, particularly over small diameters, at high precision requirements, to offset the end sections relative to each other.

FIG. 4 shows in a section through a connecting area a belt with the customary pull threads having a round cross section. The distance 15 between the pull threads should be as small as possible. If a ratio is established between the diameter 16 of the pull threads and the distance 15, 15 should with this connecting type be less than ten times the diameter 16. FIG. 5 illustrates as insert, narrow bands 17. Also in this instance it is important that the distance 18 is as small as possible and does not become greater than ten times the belt thickness 19.

FIG. 6 shows a toothed belt with the tooth profile 25 from which it can be seen that preferably the end sectional areas 26 and 27 were placed into the heavier material of the teeth where relatively more material is available for a connection and furthermore less deforming work is to be expected during the bending operation.

FIG. 7 shows a toothed belt with additional profile blocks 28 on the back. In this way, it is pointed out that also belts which are profiled selectively on one side or both sides may be interconnected in the manner according to the invention. FIG. 8 shows a belt with a longitudinal profile 29, preferably a V-belt. One, as well as multi-groove designs on one or also on both sides may be selected for this type of connection. In exceptional instances, the illustrated parallel tongue edges may either be conical or may be slightly undulated.

The surface of the belt may partially or entirely be provided with a protective layer, for instance, a textile layer or a film to protect the belt against wear or impart a better sliding movement upon the belt.

It is, of course, to be understood that the present invention is by no means limited to the specific showing in the drawing, but also comprises any modifications within the scope of the appended claims.

What we claim is:

1. A method of making an endless toothed transmission belt exclusively from a single web of elastic belt material having pull-resistant strength carriers embedded therein and extending in the longitudinal direction of said web, which includes in combination the steps of cutting off in a single cutting from such web a desired length so that the ends of the cut-off length of belt material have tongue and recess means with longitudinal edges parallel to said strength carriers, and with said tongue and recess means precisely complementary to and fitting into each other at an impact location, each of said tongues spanning a plurality of teeth of said toothed belt and having at least one strength carrier extending through said tongue, so that tongues on opposite ends have transversely spaced strength carriers, bending said ends toward and interfitting them into each other, and intimately bonding said ends to each other along the cut edges thereof so that the transversely spaced strength carriers of opposite ends of said belt are joined by transverse boding of said tongues and recesses along their longitudinal edges.

2. An endless toothed transmission belt comprising, in combination, a web of elastic belt material having pull-resistant strength carriers embedded therein and extending in the longitudinal direction of said web, a portion of said belt having interengaging and interfitting tongue means extending in the longitudinal direction of said belt with longitudinal abutting edges parallel to said strength carriers and intimately bonded uniformly to each other at an impact location, each of said tongues spanning a plurality of teeth of said toothed belt having at least one strength carrier extending through said tongue, so that strength carriers of adjacent tongues are spaced transversely and are connected in a bond between adjacent tongues particularly along longitudinal edges.

3. An endless transmission belt in combination according to claim 2, in which the length of said tongue means amounts to at least 20 times the distance between two strength carriers arranged adjacent to each other.

4. An endless transmission belt in combination according to claim 2, in which said tongue means includes tongues having a width covering one strength carrier only.

5. An endless transmission belt in combination according to claim 2, in which said tongue means include a plurality of tongues having their ends offset with regard to each other in the longitudinal direction of said belt.

6. An endless transmission belt in combination according to claim 2, in which said belt is profiled on at least one of its top and bottom surfaces.

7. An endless transmission belt in combination according to claim 2, in which the distance between said strength carriers is not in excess of ten times the thickness of said straight carriers.

8. An endless transmission belt in combination according to claim 6, in which the profiles on at least one of its top and bottom surfaces extend in the transverse direction of the belt, and in which the intimate uniting of the ends of said interfitting tongue means occurs in areas of the profiles of said belt.

9. An endless transmission belt in combination according to claim 6, in which the profiles on at least one of its top and bottom surfaces extend in the longitudinal direction of the belt, and in which the intimate uniting of the longitudinal edges of said tongue means occurs between the profiles of said belt.

* * * * *